United States Patent Office 3,406,264

Patented Oct. 15, 1968

3,406,264

MANUFACTURE AND TESTING OF PHONOGRAPH RECORDS

Alan Phillipson and Basil Harry Royston Spiller, London, England, assignors to Decca Limited, London, England, a British company Filed Dec. 11, 1964, Ser. No. 417,694

4 Claims. (Cl. 179—100.4)

ABSTRACT OF THE DISCLOSURE

For checking phonograph records after manufacture, an ultrasonic signal of constant amplitude and frequency is superimposed on the audio signals to be recorded so that the ultrasonic signal can be reproduced from the final sound track. At least a proportion of the records are played to check if there is any distortion or break in the reproduced ultrasonic signal. An apparatus is described for automatically comparing a constant amplitude, constant frequency ultrasonic signal with the output of an oscillator using a phase sensitive detector.

Figure 1:
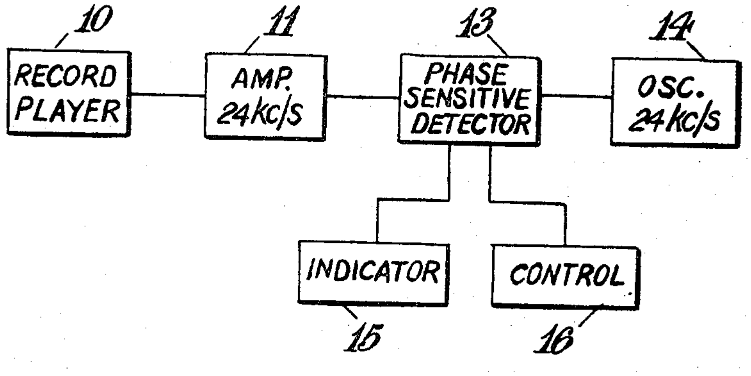

This invention relates to the manufacture of phonograph records. When phonograph records are made in large numbers, it is not possible to check each record by playing it and listening to the reproduced sound. A faulty sound track on a record is most likely to be due to a fault developing in or damage to the pressing die and therefore all subsequent records will be faulty. It is therefore the practice to check that the records being produced are satisfactory by playing a small proportion of the records being pressed from each press. If the reproduced sound from the tested record is satisfactory, it can be assumed that all the previously made records using that press will have a satisfactory sound track. Heretofore it has been the practice to employ operators to listen to a proportion of the records from each press which records are played in the normal manner. Such work is not only tedious but it is found that, after a long period, operators may tend to miss minor faults in a record. It is one of the objects of the present invention to provide automatic means for detecting the presence of faults in the sound track of a record so that the operator need only examine records which have been so detected as being faulty.

According to this invention, the process of manufacturing phonograph records comprises the steps of superimposing on the audio information to be recorded an ultrasonic signal of a frequency such that it can be reproduced from the finally manufactured records, and then subsequently playing at least a proportion of the manufactured records to reproduce the ultrasonic signal and feeding said signal into detecting means for detecting if there is any distortion or break in the ultrasonic signal so reproduced.

The invention also includes within its scope a phonograph record having an ultrasonic signal superimposed on the required audio frequency signals.

The ultrasonic signal may be superimposed on the audio signals by any convenient means, for example the ultrasonic signal might be generated by an electrical signal generator and the electrical output from the generator mixed with the electrical signals representative of the required audio information fed to the recording head for making the master record.

The invention further includes within its scope testing apparatus for checking a record such as has been described above having ultrasonic signals superimposed on the required audio signals, which testing apparatus comprises means for playing the record to provide an electrical output corresponding to the signals recorded on the sound track, means for separating the ultrasonic signals from the reproduced electrical signals and means responsive to any distortion or gap in the separated ultrasonic signal. Preferably the last mentioned means are arranged to stop the reproduction of the record in the event of any distortion or gap being detected so that the record is then available for checking by an operator at the point where the error was detected.

Conveniently the ultrasonic signal frequency is a signal of constant amplitude and constant frequency and is separated from the audio frequency signals by a filter.

Typically an ultrasonic signal of a frequency greater than 20 kc./s. might be employed. With such a frequency, any fault which might cause an effect on the reproduced audio signals would last over at least half a cycle of the ultrasonic frequency and probably over at least several cycles.

Figure 2:
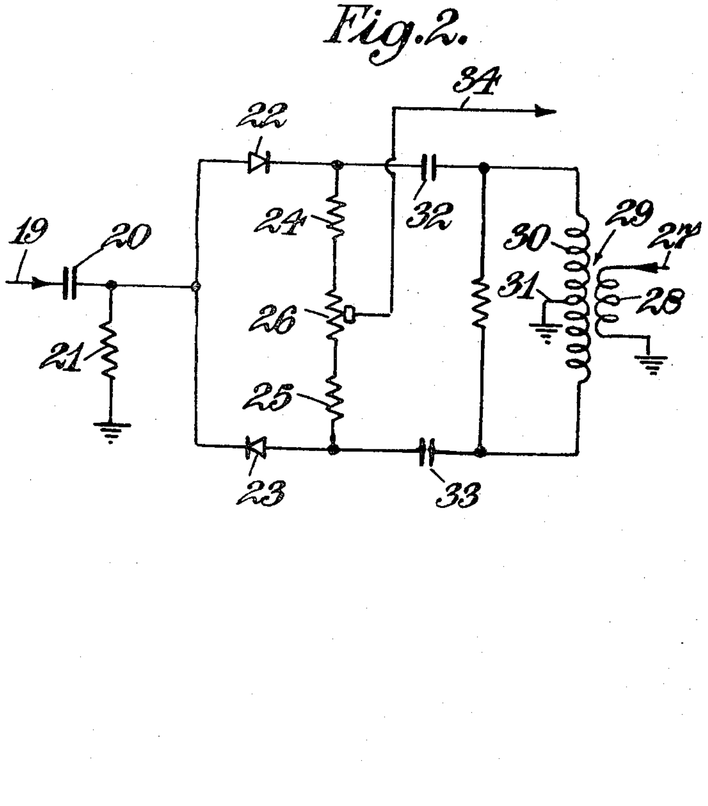

In the following description, reference will be made to the accompanying drawings in which:

FIGURE 1 is a block diagram illustrating a testing apparatus for use in making phonograph records; and FIGURE 2 is a circuit diagram of part of the apparatus of FIGURE 1.

For the present invention, the phonograph records may be made in the known manner except that an additional ultrasonic signal is superimposed on the sound track. Conveniently this signal is generated by an electrical signal generator and mixed with the electrical signals representative of the required audio information to be fed to the recording head for making the master record. For the particular embodiment to be described, the ultrasonic signals are of 24 kc./s. and are of constant amplitude.

Apart from the putting of the ultrasonic signals on the sound track, the records may be made in the known manner but, when the records have been made, all or a proportion of them are tested using the apparatus illustrated in FIGURE 1.

Referring to FIGURE 1, a record player indicated diagrammatically at 10 provides electrical output signals from a pick-up and feeds these signals to an amplifier unit 11 which selectively amplifies the 24 kc./s. component of the reproduced signals. Typically the amplifier unit 11 comprises a multi-stage pre-amplifier with capacity-resistance coupling between valve stages, a main amplifier having one or more stages with tuned circuits for selectively amplifying the 24 kc./s. signal and a cathode follower output stage to provide a low impedance output. For controlling the output of this amplifier unit, conveniently an adjustable attenuator is arranged between the pre-amplifier and the main amplifier.

If there are any faults in the record, the amplitude of the 24 kc./s. output will vary and any variations in the amplitude of the output signal from the amplifier 11 are detected by a phase sensitive detector 13. FIGURE 2 is a circuit diagram illustrating one form of phase sensitive detector for this purpose. The output from the amplifier 11 on a lead 19 is applied via a series capacitor 20 and with a shunt resistor 21 to a rectifying circuit comprising two rectifiers 22, 23 connected respectively to the two ends of a resistive potentiometer. This potentiometer is formed of fixed resistors 24, 25 and an adjustably tapped resistor 26. The output of a 24 kc./s. oscillator 14 (FIGURE 1) is applied by a lead 27 (FIGURE 2) to a primary winding 28 of a transformer 29 having a secondary winding 30 with an earthed centre tap 31. The opposite phase voltages at the two ends of the winding 30 are applied respectively by capacitors 32, 33 to the ends of the potentiometer 24, 25, 26.

The oscillator 14 provides a reference signal of approximately the same frequency as the reproduced ultrasonic frequency signal. It will be seen that the reproduced signal from the amplifier 11 is combined vectorially with two anti-phase components of the reference signal and the vector sums are peak detected by the rectifiers 22, 23 giving direct valtages proportional to their peak amplitudes. If the signal from amplifier 11 is in phase quadrature with the reference signal components, the two detectors will give equal amplitude outputs and the polarity of these rectifiers is arranged so that there is then no output voltage between a lead 34 connected to the tap on potentiometer 26 and earth. The tap may be adjusted to give exactly zero output when equal signals are applied to the rectifiers. Any change in phase from this phase quadrature condition will increase the output from one of the detectors 22, 23 and decrease the output from the other. The net output on lead 34 will not then be zero but will have a magnitude dependent on the extent of departure from the phase quadrature condition and a polarity indicative of whether this departure is a phase advance or a phase lag. Any change in amplitude of either the reference signal or the signal from the amplifier 11 will produce a change in the output level on lead 34. The oscillator 14 is arranged to give constant output voltage. In the record player 10, the turntable speed may be closely controlled to be as constant as possible and the reproduced signals of ultrasonic frequency will have a frequency approximately equal to that of the oscillator 14. Any frequency difference will cause the output of the phase sensitive detector on lead 34 to vary alternately positive and negative since the phase relationship between the oscillator output and the reproduced signal will be changing continuously. The frequency of the variation will be the frequency difference between the two input signals to the phase sensitive detector 13.

Thus the output signal on lead 34 will, in general, be an alternating voltage having an amplitude dependent on any variations in amplitude of the reproduced ultrasonic frequency signal. If the record is satisfactory, there will be no such variations; however any distortions or gaps in the reproduced signal due to imperfections in the record will cause the amplitude of the signal on lead 34 to vary. This signal may be fed to an indicator 15 (FIGURE 1), for example, a valve voltmeter which will give a visual and/or aural indication of changes in the output signal. Additionally or alternatively the output from the phase sensitive detector 15 may be fed to a control unit 16 arranged to stop the reproduction of the recorded signals in the event of any change in the output level from the phase sensitive detector 15 so that the record can then readily be checked by an operator. A warning light or alarm signal may be provided which is operated when a fault is detected, to attract an operator's attention. The operator can then listen to the reproduced audio signals from the part of the sound track where the fault was detected to check if the record is to be rejected.

Although one form of apparatus for detecting changes in the level of the reproduced ultrasonic frequency signal has been particularly described, it will be readily apparent that there are many other ways in which this might be done. For example, the separated signal of ultrasonic frequency for the amplifier 11 may be divided into positive and negative going half cycles which can be separately squared to bring them to constant amplitude and standardised waveform. The two sets of resultant square wave signals may then be integrated and the integrated outputs compared. If the time constant of integration was very short, such a comparison means would detect the absence of a single half cycle in the ultrasonic signal. In many cases however it may be preferred to use a longer time constant of integration depending on the frequency employed and on the requirements. In one form of the apparatus, the outputs from the two integrators are fed in opposition to a single transistor which gives an output only when there is a difference between the two integrated signals.

We claim:

1. Testing apparatus for checking a phonograph record having an ultrasonic signal of a constant frequency and amplitude superimposed on the recorded audio frequency signals, which testing apparatus comprises means for playing the record to provide an electrical output corresponding to the signals recorded on the sound track, means for separating the ultrasonic signals from the reproduced electrical signals, an oscillator generating a reference signal of a frequency closely approximately that of the reproduced ultrasonic signal, circuit means coupled to said oscillator separately providing two opposite phase components of the reference signal, means vectorially combining the reproduced ultrasonic signal separately with said two opposite phase components of the reference signal, two rectifying means respectively rectifying the two vectorially combined signals, and means giving an output representative of the difference of the outputs of said two rectifying means.

2. A process for manufacturing phonograph records comprising the steps of superimposing on the audio information to be recorded an ultrasonic signal of a constant frequency such that it can be reproduced from the finally manufactured records, and then subsequently playing at least a proportion of the manufactured records to reproduce the ultrasonic signal, detecting if there is any distortion in the ultrasonic signal and indicating any detected distortion.

3. Testing apparatus for checking a phonograph record having an ultrasonic signal, of a constant amplitude and a constant frequency such that it can be reproduced from the finally manufactured record, superimposed on the recorded audio frequency signals, which testing apparatus comprises means for playing the record to provide an electrical output corresponding to the signals recorded on the sound track, means for separating the ultrasonic signals from the reproduced electrical signals, means responsive to any distortion in the separated ultrasonic signal and an indicator coupled to said responsive means to indicate any detected distortion in the amplitude of the ultrasonic signal.

4. A process for manufacturing phonograph records comprising the steps of superimposing on the audio information to be recorded an ultrasonic signal of constant frequency and constant amplitude such that it can be reproduced from the finally manufactured records, making the records with sound tracks carrying the superimposed signals, subsequently playing at least a proportion of the manufactured records to reproduce the recorded signals, separating the ultrasonic signal of constant frequency from the reproduced signals, detecting if there is any variation in the amplitude of the separated ultrasonic signal and indicating any detected amplitude variation.

References Cited

UNITED STATES PATENTS

| | | | |
|---|---|---|---|
| 2,337,958 | 12/1943 | Albin | 179—100.3 |
| 2,797,263 | 6/1957 | Dolby | 179—100.2 X |
| 3,171,902 | 3/1965 | Jones et al. | 179—100.2 X |
| 3,249,888 | 5/1944 | Sinnett | 179—100.4 |
| 2,622,155 | 12/1952 | Dutton | 179—100.2 |
| 3,182,135 | 5/1965 | Siezen | 179—100.2 |
| 2,774,056 | 12/1956 | Stafford | 179—100.2 |

BERNARD KONICK, *Primary Examiner.*

R. F. CARDILLO, *Assistant Examiner.*